(12) United States Patent
Kimura et al.

(10) Patent No.: US 6,677,767 B2
(45) Date of Patent: Jan. 13, 2004

(54) DISPLACEMENT SENSOR

(76) Inventors: Masahiro Kimura, 15-20, Mukaida, Yamayashiki-cho, Chiryu-shi, Aichi-ken (JP); Kiyohiro Fukaya, 6-8-6, Shimizu-cho, Takahama-shi, Aichi-ken (JP); Kouji Akashi, 8-3, Maeda, Katahara-cho, Gamagori-shi, Aichi-ken (JP); Keiji Yasuda, 1-2-6, Hamada-cho, Handa-shi, Aichi-ken (JP)

( * ) Notice: Subject to any disclaimer, the term of this patent is extended or adjusted under 35 U.S.C. 154(b) by 20 days.

(21) Appl. No.: 10/102,735

(22) Filed: Mar. 22, 2002

(65) Prior Publication Data

US 2002/0145420 A1 Oct. 10, 2002

(30) Foreign Application Priority Data

Mar. 23, 2001 (JP) .......................................... 2001-085651

(51) Int. Cl.[7] ............................................... G01R 27/08
(52) U.S. Cl. ........................................ 324/716; 324/715
(58) Field of Search ................................. 324/713, 714, 324/715, 716, 722, 723, 724

(56) References Cited

FOREIGN PATENT DOCUMENTS

| JP | 5-8920 | 7/1991 |
|---|---|---|
| JP | 2575538 | 10/1992 |
| JP | 7-22214 | 7/1993 |
| JP | 8-236320 | 2/1995 |
| JP | 8-285516 | 5/1995 |

*Primary Examiner*—Albert Decady
*Assistant Examiner*—James Kerveros
(74) *Attorney, Agent, or Firm*—Reed Smith LLP; Stanley P. Fisher, Esq.; Juan Carlos A. Marquez, Esq.

(57) ABSTRACT

A contact-type displacement sensor for detecting a displacement of an object to be detected based on a change in a resistance value includes a resistor having a surface to be slid, a slider which slides on the surface to be slid in a predetermined direction in accordance with a displacement of the object to be detected, and an irregular pattern formed on the surface to be slid and including convex portions and concave portions continuously formed along a direction crossing or perpendicular to a sliding direction of the slider.

9 Claims, 8 Drawing Sheets

Set height of a slider — H
Height of a protective portion of a slider — h

DISPLACEMENT SENSOR

CROSS REFERENCE TO RELATED APPLICATIONS

This application is based on and claims priority under 35 U.S.C. §119 with respect to a Japanese Patent Application 2001-085651, filed on Mar. 23, 2001, the entire content of which is incorporated herein by reference.

FIELD OF THE INVENTION

This invention generally relates to a displacement sensor.

BACKGROUND OF THE INVENTION

A displacement sensor is disclosed in, for example, a Japanese Patent Laid-Open Publication No. 7(1995)-22214. Referring to FIGS. 2(A) and 2(B), a slider 201 displaced by a displacement of an object to be detected is disposed so as to slide on a resistor 202. A ground (GND) terminal 205 connected to a ground (GND) 206 and an electric power source terminal 203 connected to an electric power source 204 are connected to both ends of the resistor 202, respectively. The resistor 202 includes a lower resistance layer 208 accumulated on a flat surface of a substrate 207, and an upper resistance layer 209 accumulated on the lower resistance layer 208.

According to the displacement sensor with the aforementioned structure, the lower resistance layer 208 is made of a material in which carbon black and carbon fiber 210 are dispersed in a synthetic resin. Therefore, there may be a case where an axial direction of the carbon fiber 210 resides in a direction perpendicular to the sliding direction along which the slider 201 slides. For example, as shown in FIG. 2(A), there may be a case where the axial direction of the carbon fiber 210 and the sliding direction of the slider 201 reside continuously in the same directions. Particularly, referring to FIG. 2(B), a large amount of carbon fiber 210 is contained in the lower resistance layer 208. The axial direction of the carbon fiber 210 extends in the direction perpendicular to the sliding direction of the slider 201.

Referring to FIG. 2(B), a large amount of carbon fiber 210 is found in the lower resistance layer 208 so that an irregular pattern may be formed on the lower resistance layer 208 along the sliding direction of the slider 201. As a result of this, the irregular pattern may be also formed on the upper resistance layer 209 along the sliding direction of the slider 201.

When the slider 201 slides on the upper resistance layer 209, abrasion powder is produced. The abrasion powder is deposited in concave portions formed on the upper resistance layer 209 so as to form an abrasion powder deposited portions 211. The abrasion powder deposited portions 211 (i.e., the concave portions) extend along the direction perpendicular to the sliding direction of the slider 201 on the upper resistance layer 209. Therefore, while the slider 201 slides on the abrasion powder deposited portions 211, the electric conduction between the slider 201 and the resistor 202 is disconnected or the resistance therebetween is increased. As a result of this, signal noise may be increased and detection accuracy of the displacement sensor may be deteriorated with elapse of time.

Accordingly, the above disclosed displacement sensor is still susceptible of certain improvements with respect to providing a contact-type displacement sensor for maintaining a high level of accuracy, especially with an elapse of time.

According to a variable resistor or displacement sensor disclosed in Japanese Patent Laid-Open Publications No. 8 (1996)-285516 and No. 8 (1996)-236320, and in a Japanese Utility Model Publication No. 2575538, when a rotor to which the slider is attached is inclined, the slider may undergo excessive elastic or plastic deformation due to the poor function of a protective member, i.e., a clearance formed between the slider and the resistor is located at a position apart from the slider. That is, if the rotor is rotated in an inclined condition in a state where the slider is disposed at an outer periphery of the rotor and the slider protective member is disposed at an inner periphery of the rotor and vice versa, the slider may be compressed at an amount equal to or greater than a difference between "a set height of the slider" and "a height of the protective member" at a certain rotational position of the rotor. This means that the protective member may not function effectively.

Accordingly, the above disclosed displacement sensors are still subjected to certain improvement with respect to supplying a protective member for assuring a clearance between a slider and a resistor.

Further, a Japanese Utility Model. Publication No. 5 (1993)-8920 discloses a structure in which a stopper for restricting the deformation of the slider is provided to the slider itself. According to the structure, however, the stopper is made of a conductive material. Therefore, when the stopper and the resistor are brought into contact with each other, the slider and the resistor may be electrically short-circuited. Further, an erroneous detection signal or a noise may be outputted.

Accordingly, the above disclosed displacement sensor is still subjected to certain improvement with respect to preventing a slider and a resistor from being electrically short-circuited.

Further, according to one of known displacement sensors or one of known variable resistors, a rotational member such as a rotor is crimped or a speed nut or a snap ring is employed as a component for rotatably supporting the rotational member in a housing and for preventing the rotational member from being removed in an axial direction. However, predetermined equipments or tools are required for crimping the rotational member. Further, the number of components for the displacement sensor or the variable resistor may be increased by adding components including speed nuts. This may lead to a cost increase.

SUMMARY OF THE INVENTION

The present invention provides a displacement sensor which is a contact-type displacement sensor for detecting a displacement of an object to be detected based on a change of a resistance value. The displacement sensor includes a resistor having a surface to be slid, a slider sliding on the surface to be slid in a predetermined direction (i.e., a predetermined direction, for example in one direction) in accordance with the displacement of the object to be detected, and an irregular pattern formed on the surface to be slid and including convex portions and concave portions continuously formed along a direction crossing or perpendicular to a sliding direction of the slider.

According to this displacement sensor, the irregular pattern can be formed on the surface of the resistor, without adding filler, carbon fiber, or the like, to the resistor. A stable contact can hence be achieved between the slider and the convex portions formed on the resistor, and accordingly, a stable conduction can be maintained between the slider and the resistor. Therefore, signal noise can be effectively decreased and detection accuracy can be maintained with an elapse of time, and accordingly, durability can be prolonged.

BRIEF DESCRIPTION OF THE DRAWING FIGURES

The foregoing and additional features and characteristics of the present invention will become more apparent from the following detailed description considered with reference to the accompanying drawing figures wherein:

FIG. 1(A) is a diagram for illustrating a structure of a displacement sensor according to a first embodiment of the present invention, and FIG. 1(B) is a cross-sectional view taken along a line B—B of FIG. 1(A);

FIGS. 2(A) and 2(B) are diagrams for illustrating a structure of a known displacement sensor, FIGS. 3(A) to 3(C) are exploded assembly diagram for illustrating an example of applying the displacement sensor according to the first embodiment of the present invention;

Figure 9A:
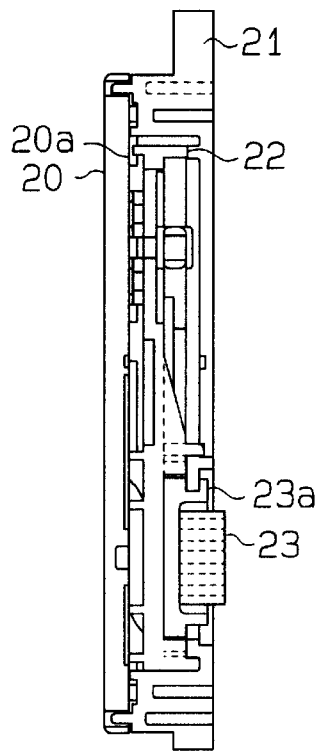
Figure 9B:
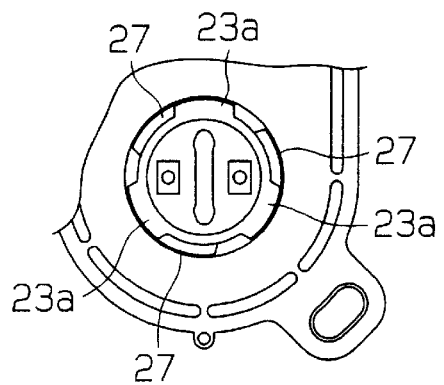
Figure 10:
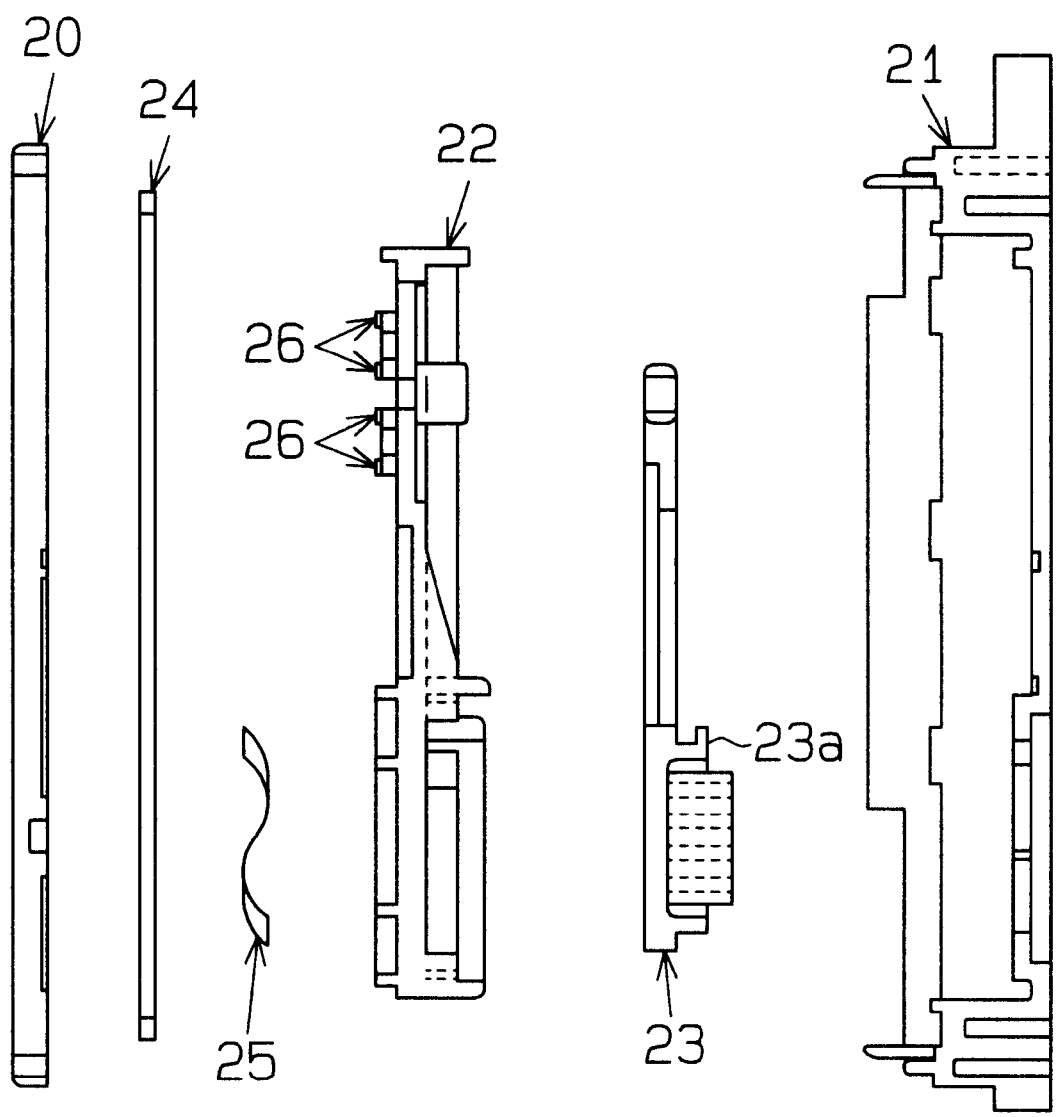

FIGS. 9(A) and 9(B) are diagrams for illustrating a structure of a displacement sensor according to a third embodiment of the present invention, and FIG. 9(B) is a side view showing a main portion of FIG. 9(A);

FIG. 10 is an exploded view of the displacement sensor shown in FIG. 9

Figure 11:
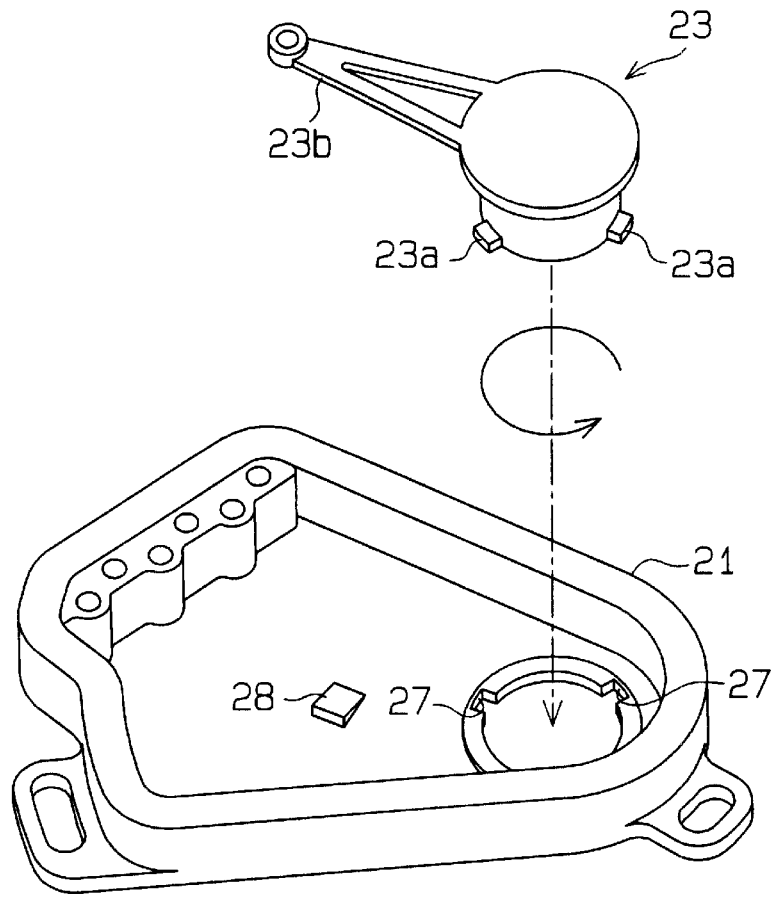
Figure 12:
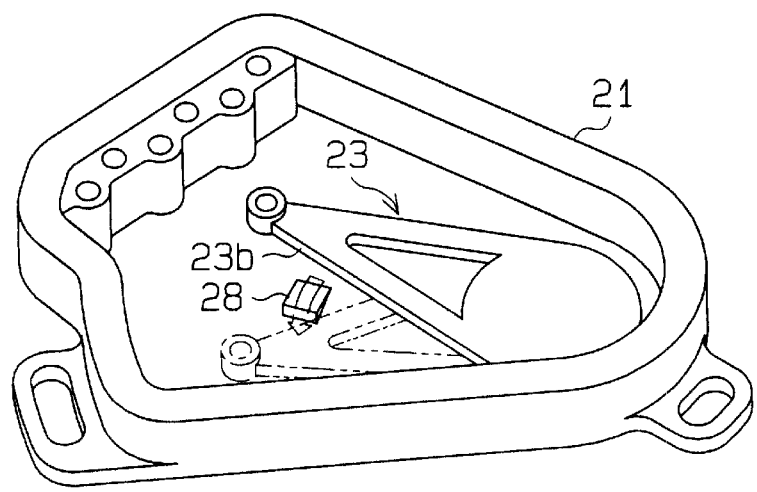

FIG. 11 is an exploded view for illustrating a structure of a displacement sensor according to a fourth embodiment of the present invention; and FIG. 12 is a view for illustrating the operation of the displacement sensor shown in FIG. 11.

DETAILED DESCRIPTION OF THE INVENTION

In a preferable embodiment of the present invention, an irregular pattern is formed to bring convex portions of the irregular pattern into contact with a slider at plural portions. Therefore, even when abrasion powder produced by a sliding movement of the slider is formed on the surface to be slid of the resistor, high electric conductivity is assured between the slider and the resistor, i.e., the surface to be slid.

A displacement sensor according to the present invention is preferably applied to a displacement sensor in which the slider is constituted so as to slide in a predetermined direction, for example, in one direction or interchangeable with another direction.

The displacement sensor of the present invention is applicable to a straight-moving type displacement sensor (a variable resistor), in which the slider basically exhibits parallel movements, or a rotational-type displacement sensor, in which the slider basically exhibits circular movement. In addition, the irregular pattern can be formed on the resistor so that the pattern has a proper circular arc shape.

In a preferable embodiment of the present invention, the resistor is provided with a single layer or a plurality of layers.

Further, in a preferable embodiment of the present invention, the irregular pattern is formed in a range being wider than the width of the slider and is continuously formed in a range being wider than an operation range or a sliding range of the slider along a sliding direction of the slider. Concave portions are hence continuously formed outside the operation range of the slider, as well. Therefore, the abrasion powder is pushed out along the concave portions of the irregular pattern so that the abrasion powder cannot be easily accumulated within the operation range of the slider.

Further, in a preferable embodiment of the present invention, it is preferable to directly polish the substrate of the resistor for providing the irregular pattern when the substrate of the resistor is a common circuit substrate made of glass fiber, epoxy resin and the like. Further, when the resistor is directly printed on a molded substrate made of synthetic resin, the irregular pattern can be formed by using a mold which has been provided with the irregular pattern on its surface beforehand. Therefore, a step for polishing the substrate can be omitted. Further, this method can effectively avoid an increase in cost.

Further, in a preferable embodiment of the present invention, the concave portions are formed to have a depth of 3 μm or greater than that on the substrate so as to be sufficiently deep relative to the particle diameters of abrasion powder produced by the sliding action of the slider.

Further, in a preferable embodiment of the present invention, the cross-sectional shape of each concave portion and convex portion is either one of a circular arc shape, a triangular shape, a rectangular shape, a square shape, and a polygonal shape including a pentagonal shape.

The displacement sensor of the present invention is also employable as a variable resistor. Further, the displacement sensor can include a displacement member and a projection. The displacement member is assembled with the slider and is displaced in accordance with the displacement of the object to be detected. The projection is formed at an electrically insulative portion being adjacent to a slider mounting portion on the displacement member and being projected toward the resistor. The displacement member can be a rotor in the shape of a circular plate or in a ring shaped structure which is rotated in accordance with rotation of the object to be detected.

In such a case, the projection as a slider protective member for preventing the slider from undergoing excessive elastic deformation or plastic deformation is disposed being adjacent to the slider. Therefore, a sufficient height can be assured for the slider even when the member to which the slider is attached, for example, the rotor is deformed. The projection is attached to the insulator, for example to the rotor. Therefore, elastic short-circuit between the slider and the resistor can be prevented even when the projection comes in contact with the resistor.

Further, the displacement sensor can include a rotational member displaced in accordance with the displacement of the object to be detected, a claw formed on the rotational member, a housing accommodating the rotational member therein and rotatably supporting the rotational member, and a notch formed in the housing or in a member fixed to the housing and into which the claw is inserted. Therefore, the rotational member is secured to the housing so as not to come out thereof by a rotational operation of the rotational member at a predetermined angle after the claw is inserted into the notch upon assembling.

The housing or the member fixed to the housing further can include a return stopper or a projection for preventing the rotational member from being rotated in a reverse direction after the rotational member is operated to be rotated at the predetermined angle upon assembling.

Therefore, the rotational member is screwed into the housing and is rotatably assembled relative to the housing. The rotational member can be secured to the housing so as not to move in the axial direction.

Referring to FIGS. 1(A) and 1(B), a slider 1 displaced in accordance with a displacement of an object to be detected is disposed so as to slide on a resistor 2. A ground (GND) terminal 5 connected to a ground (GND) 6 and an electric power source terminal 3 connected to an electric power source 4 are connected to both ends of the resistor 2, respectively. The resistor 2 includes a substrate 7 and a resistance layer 8 accumulated on the substrate 7.

A fine irregular pattern 7a is formed on the surface of the substrate 7 by a proper method including polishing and molding. The irregular pattern 7a includes concave portions and convex portions continuously formed in a direction perpendicular to a sliding direction of the slider 1. A resistance layer 8 is accumulated by a method including printing on the surface of the substrate 7, i.e., on the irregular pattern 7a.

An irregular pattern 2a including grooves or continuous ridge lines extending along a sliding direction of the slider 1 is formed on the surface of the resistance layer 8 so as to coincide with the irregular pattern 7 formed on the surface of the substrate 1. The continuous ridge lines include concave portions and convex portions also continuously formed on the irregular pattern 2a in a direction along the sliding direction of the slider 1. Further, at least two convex portions of the irregular pattern 2a are formed per slider so as to be in contact with the slider 1. Further, the irregular pattern 2a is formed to have a width larger than the width of the slider 1. Therefore, the convex and concave portions are continuously formed on the surface to be slid of the resistor 2 over wide width in a direction crossing or basically perpendicular to the sliding direction of the slider 1 (i.e., in a cross-sectional direction taken along a line B—B of FIG. 1(A)).

When the displacement sensor is employed, the slider 1 is slidably moved on the surface of the resistor 2, i.e., the resistance layer 8. In such a case, the slider 1 is always maintained to be in contact with the plural convex portions in the irregular pattern 2a. The slidable movement of the slider 1 on the surface of the resistor 2, i.e., the resistance layer 8 produces abrasion powder so as to form an abrasion powder accumulated portions 9 in the concave portions of the irregular pattern 2a. Since the abrasion powder accumulated portions 9 are formed along the sliding direction of the slider 1, sufficient conduction between the slider 1 and the resistor 2 is attained. Further, according to this displacement sensor of a first embodiment of the present invention, the irregular pattern 2a is formed in a range wider than the width of the slider 1, i.e., outside the width of the slider 1. The abrasion powder is hence pushed into the concave portions located outside the width of the slider 1 by the slider 1 so as to be accumulated therein. Therefore, the abrasion powder is not easily accumulated in the operation range of the slider 1.

Therefore, according to the displacement sensor of the first embodiment of the present invention, high conducting performance can be attained between the slider 1 and the resistor 2. This prevents signal noise from being increased and detecting accuracy of the displacement sensor from being deteriorated with elapse of time. Further, durability can be prolonged.

Figure 3A:
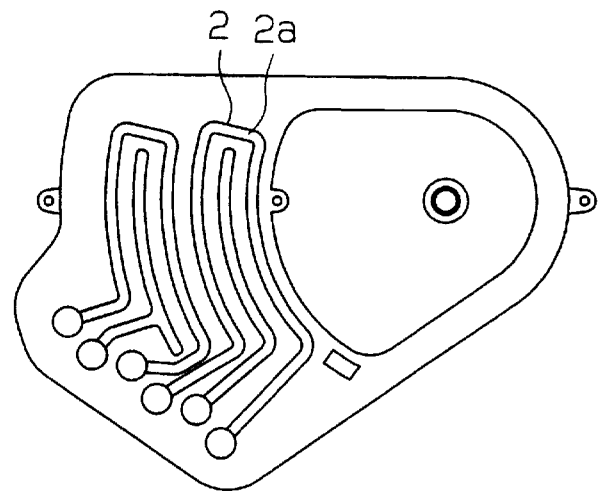
Figure 3B:
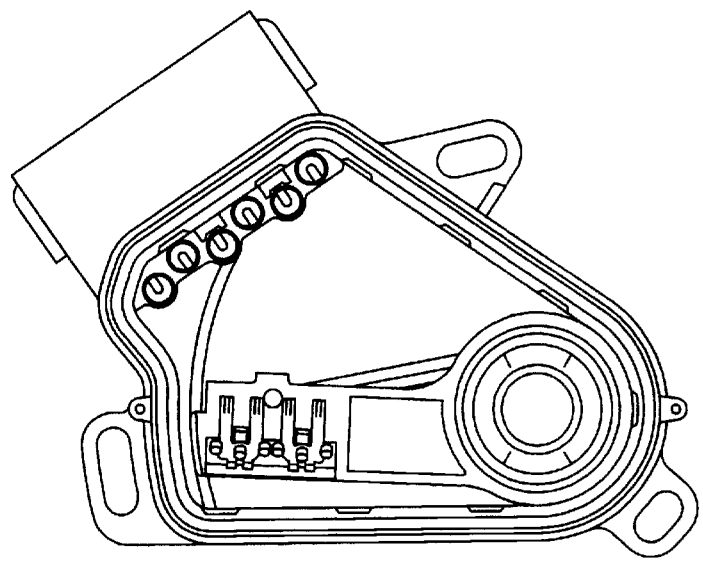
Figure 3C:
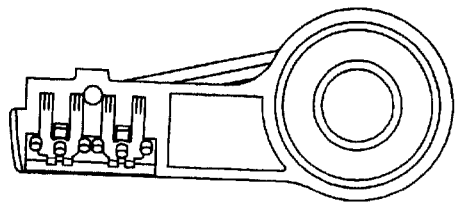

Referring to FIGS. 3(A) to 3(C), the resistor 2 has a portion formed in the shape of a curve. In other words, the resistor 2 has a circular arc-shaped portion. The slider 1 shown in FIG. 3(C) is attached to a housing for the slidable movement on the irregular pattern 2a of the resistor 2 shown in FIG. 3(A).

Next, description will be given about a displacement sensor to which the displacement sensor according to the first embodiment of the present invention described above is applied or the structure of the slider and the resistor featured in the displacement sensor of the first embodiment of the present invention is applicable.

Then, a displacement sensor according to a second embodiment of the present invention is described below with reference to FIGS. 4 through 8.

Figure 4:
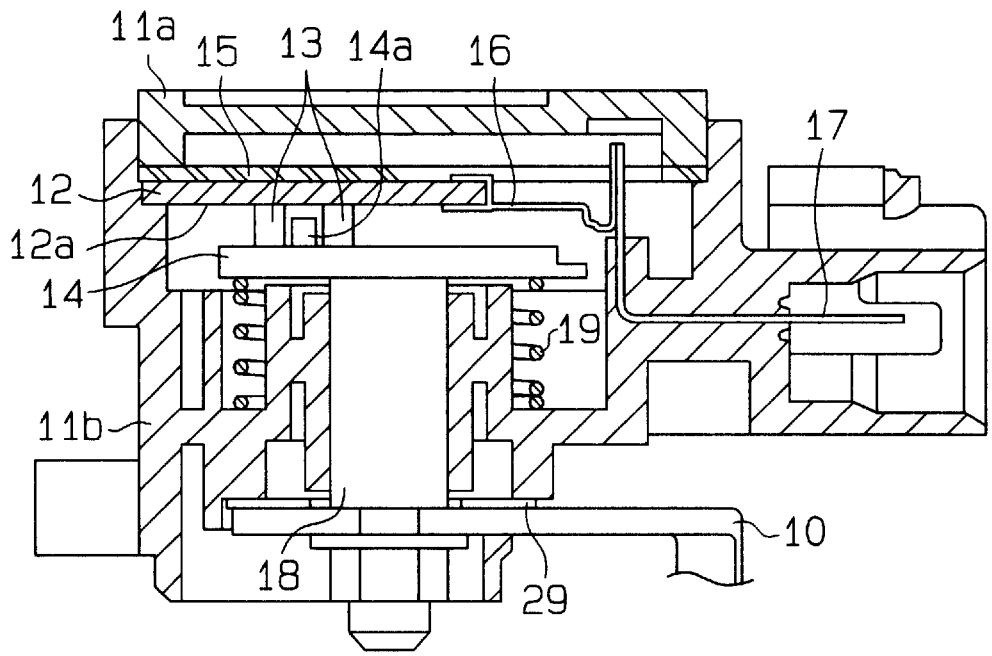
FIG. 4 is a diagram for illustrating a structure of a displacement sensor according to a second embodiment of the present invention.

Referring to FIG. 4, the displacement sensor according to the second embodiment of the present invention is assembled by connecting a cover 11a for holding a resistor 12a to a housing 11b for supporting a rotational shaft 18 of a rotor 14 to be rotated. A lever 10 is pivotably fixed to the rotor 14. A thrust washer 29 is interposed between the housing 11b and the lever 10. A spring 19 is interposed between the housing 11b and the rotor 14. A comb-shaped slider 13 is attached on the rotor 14. The slider 13 is biased toward the resistor 12a by a biasing force of the spring 19. Further, a projection 14a is shaped with the rotor 14.

Figure 1:
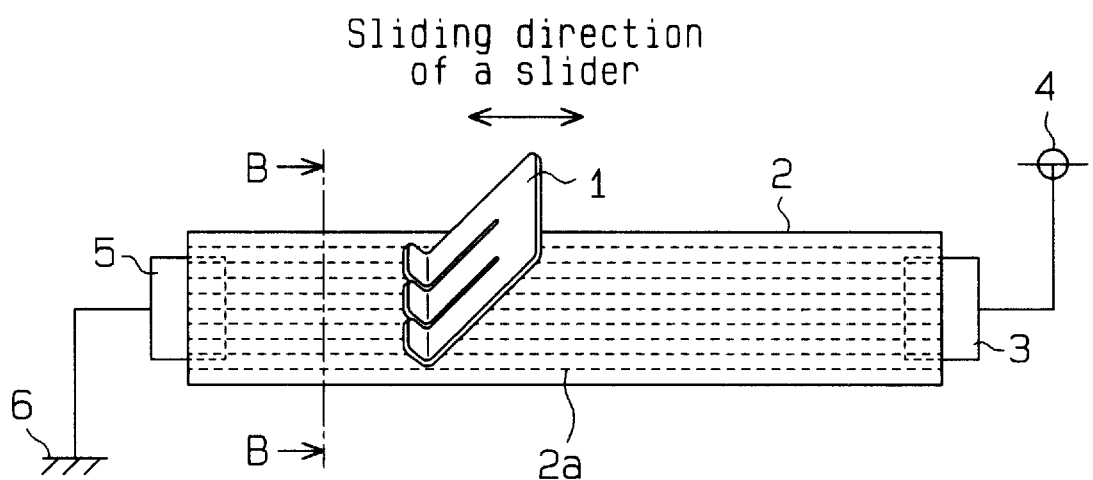
Figure 1:
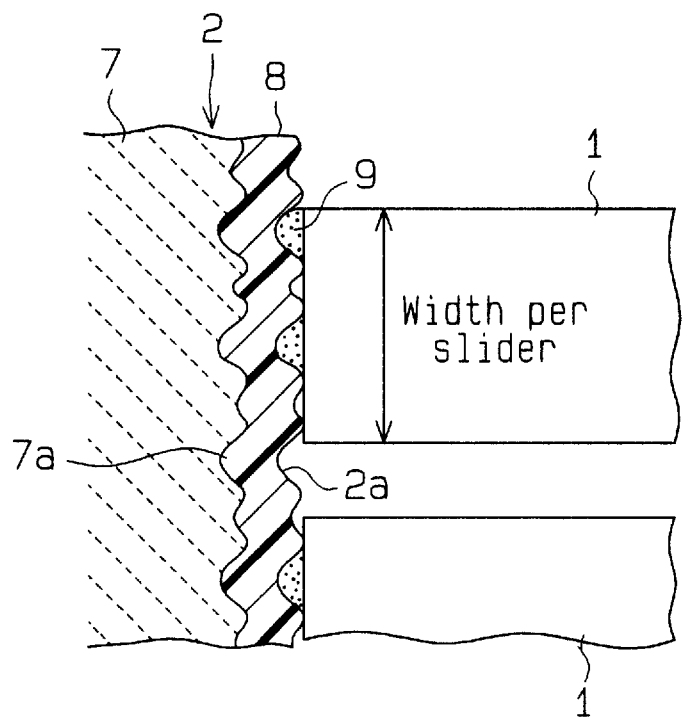
Figure 2A:
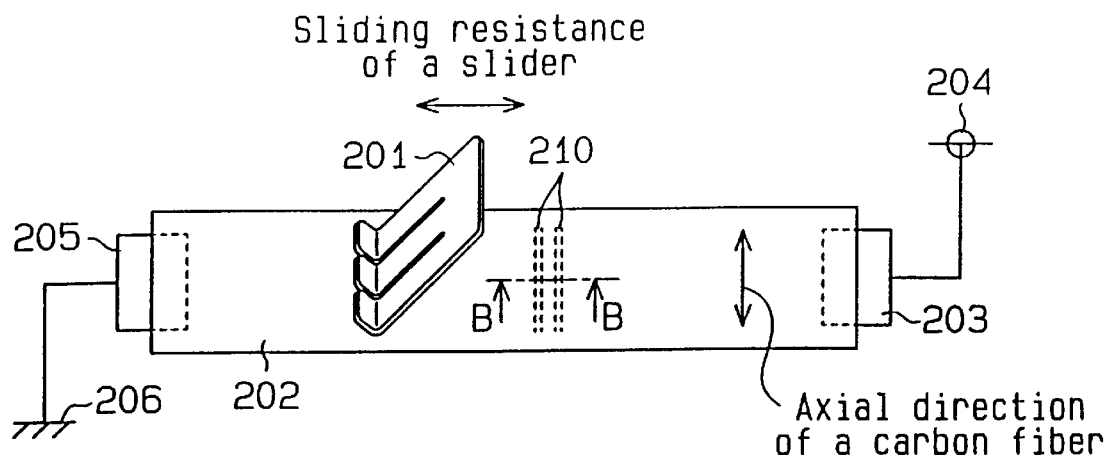
Figure 2B:
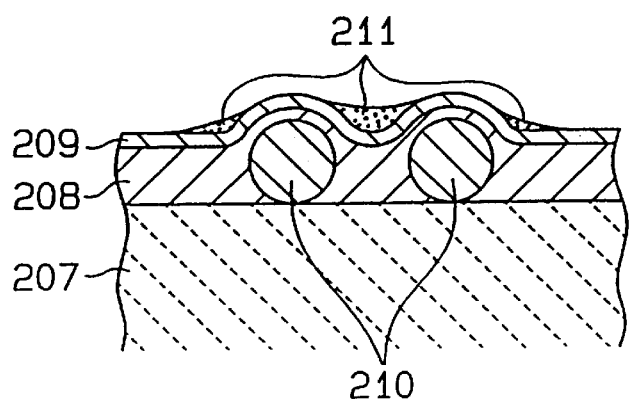

A substrate 12 is accommodated in the cover 11a. A seal 15 is interposed between the cover 11 and the substrate 12. The resistor 12a having the irregular pattern 2a, as shown in FIG. 1, is formed on the surface of the substrate 12 at the side of the slider 13. The resistor 12a is electrically connected to a connector terminal 17 via a substrate terminal 16. A signal for representing a displacement of a rotational angle of the rotor 14 can be determined via the connector terminal 17.

Next, a structure for attaching the slider 13 to the rotor 14, and a structure between the slider 3 and the resistor 12a will be described in detail.

Figure 5:
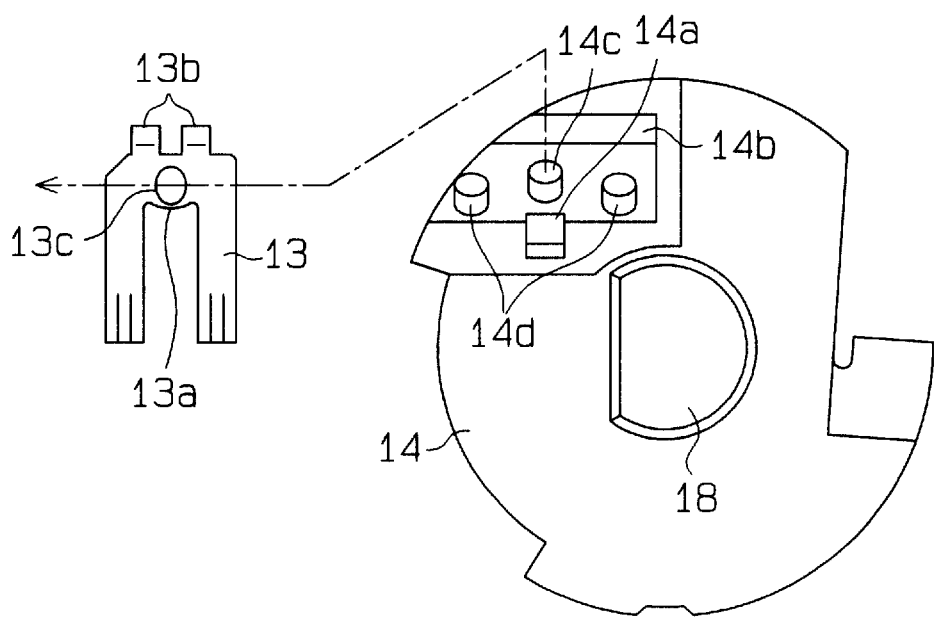
FIG. 5 is an exploded view for illustrating a structure for assembling a slider included in the displacement sensor shown in FIG. 4.
Figure 6:
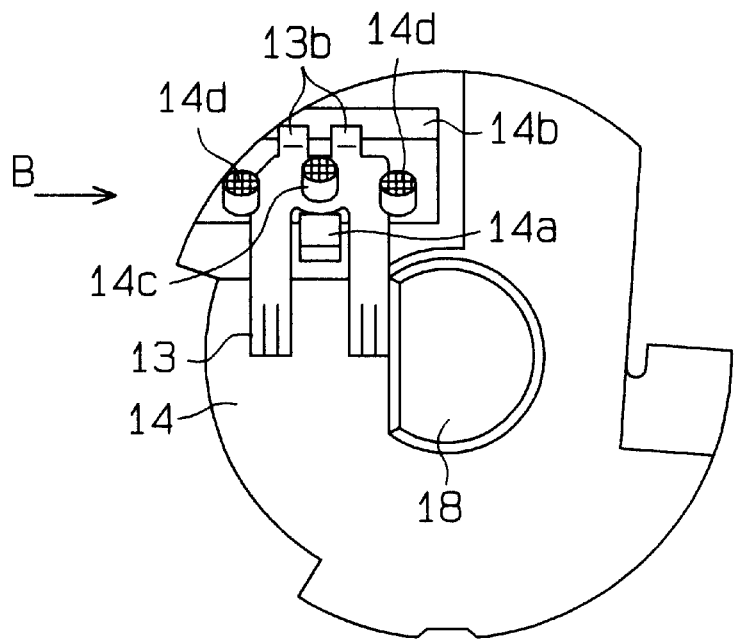
FIG. 6 is an assembly diagram for illustrating a structure for assembling the slider included in the displacement sensor shown in FIG. 4.
Figure 7:
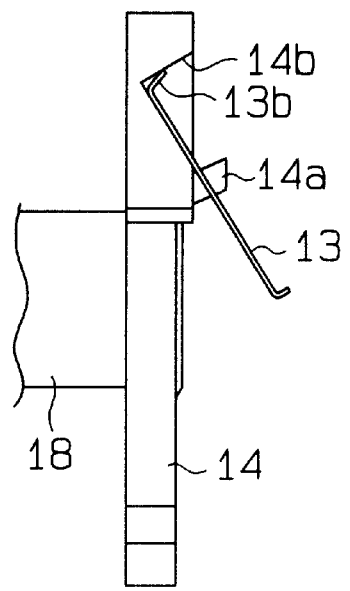
FIG. 7 is a diagram viewed along an arrow B of FIG. 6.

Referring to FIGS. 5 to 7, a projection 14a, a spring bearing 14b, a securing pin 14c, and a guide pin 14d are formed being adjacent to one another at a slider mounting portion (i.e., a holding portion) on the rotor 14. The guide pin 14d is arranged at a side portion of the securing pin 14c. At least a portion of the rotor 14 to be in contact with the slider 13 and the projection 14a are manufactured to be insulative.

On the other hand, an elastic portion 13b is formed at a base portion of the slider 13. An oblong hole 13c is defined at a central portion of the slider 13. The slider 13 is provided with a plurality of strap-shaped portions at a side opposed to the elastic portion 13b relative to the oblong hole 13c. A top end of each strap-shaped portion is formed in the shape of comb. The comb-shaped portions slide on the resistor 12a.

When the slider 13 is mounted on the rotor 14, the securing pin 14c is inserted into the oblong hole 13c so as to bring the elastic portion 13b to be in contact with the spring bearing 14b and so as to push a reference end portion 13a against the projection 14a. The base portions of the plural strap-shaped portions are inserted between the securing pin 14c and the guide pin 14d, respectively.

Then, the securing pin 14c and the guide pin 14d are welded by a welding method including heat welding or ultrasonic welding so as to crimp and secure the slider 13 to the rotor 14.

Next, a slidable contact condition of the slider relative to the resistor is described below.

Figure 8:
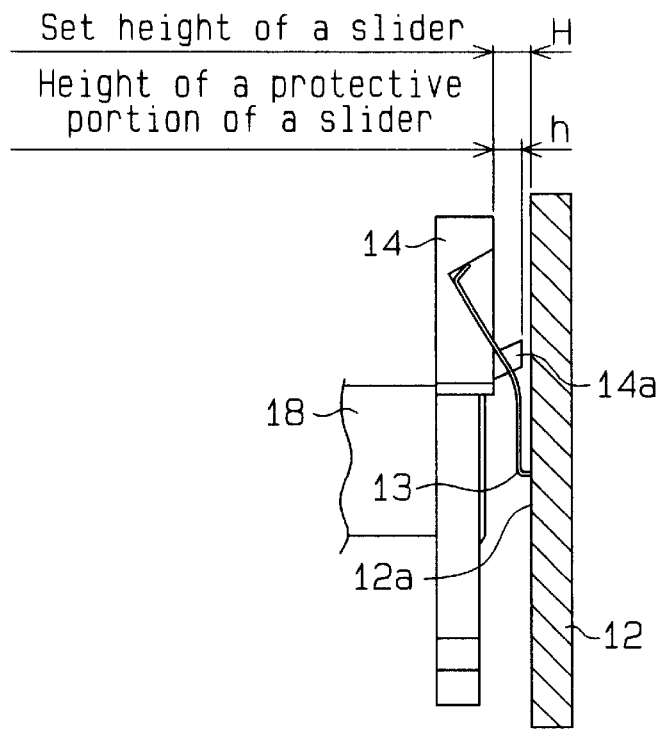
FIG. 8 is a side view for illustrating a state where the slider included in the displacement sensor shown in FIG. 4 is in slide contact with a resistor.

Referring to FIG. 8, a projecting portion 14a, which is a rigid body, projects having a height (i.e., a height of a protective portion of the slider 13) h relative to a clearance between the rotor 14 and the resistor 12a, i.e., relative to a set height H of the slider 13 having flexibility. Therefore, even when the clearance between the rotor 14 and the resistor 12a is reduced, the slider 13 is prevented from being compressed at "H-h" or greater than that. This structure prevents the slider 13 from undergoing excessive elastic deformation or excessive plastic deformation. Further, the projection 14a effectively serves as a protective member of the slider 13 owing to the projection 14a disposed adjacent to the slider 13 even when the rotational shaft 18 and the rotor 14 are rotated in an inclined state.

Further, the projection 14a is insulative so that an electric short-circuit between the slider 13 and the resistor 12a is prevented even when the projection 14a becomes in contact with the resistor 12a.

According to the second embodiment of the present invention, the projection 14a serves as a position determining member of the slider 13 relative to the rotor 14 and as the protective member of the slider 13. The position determining member and the protective member can be separately provided.

Next, a displacement sensor according to a third example of the present invention will be described.

Referring to FIGS. 9(A), 9(B), and FIG. 10, the displacement sensor (i.e., a variable resistor) includes a housing 21 which accommodates a substrate 20, an O-shaped ring 24, a wave washer 25, a slider holder 22 including a slider 26, and a joint lever 23 rotated in response to a rotation of the object to be detected.

The substrate 20 is provided with a resistor 20a having an irregular pattern identical to the irregular pattern 2a shown in FIG. 1 on its surface.

The joint lever 23 is provided with plural claws 23a projecting outward in a radial direction. The plural claws 23a are arranged apart from one another at a predetermined interval on the ring-shaped portion of the joint lever 23 along a circumferential direction thereof. On the other hand, plural notches 27 are defined in the housing 21. The plural notches 27 are arranged apart from one another at a predetermined interval on the ring-shaped portion of the housing 21 along a circumferential direction thereof.

When the joint lever 23 is assembled into the housing 21, the plural claws 26a are first inserted into openings of the plural notches 27, respectively. The joint lever 23 is then operated to be rotated so that the plural claws 23 are displaced from the openings of the plural notches 27. Therefore, the joint lever 23 is secured to the housing 21 so as not to come out thereof. The joint lever 23 assembled into the housing 21 as described above is rotated as the object to be detected rotates so as to transmit the rotation to the slider holder 22.

FIG. 11 shows a modified displacement sensor according to the third embodiment of the present invention illustrated in FIG. 3.

Referring to FIGS. 11 and 12, the displacement sensor according to a fourth embodiment of the present invention includes the housing 21 formed with a return stopper 28 for the joint lever 23. When the joint lever 23 is assembled into the housing 21, the plural claws 23a are inserted into the plural notches 27, respectively. When the joint lever 23 is rotated at a predetermined rotational angle, a lever portion 23b of the joint lever 23 comes over the return stopper 28. The plural claws 23a hence cannot be returned to the openings of the plural notches 27. Therefore, the joint lever 23 can be prevented from coming out of the housing 21 after assembling.

The principles, preferred embodiment and mode of operation of the present invention have been described in the foregoing specification. However, the invention which is intended to be protected is no to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A contact-type displacement sensor for detecting a displacement of an object to be detected based on a change of a resistance value, comprising:

a resistor having a surface to be slid;

a slider sliding on the surface to be slid in a predetermined direction in accordance with the displacement of the object to be detected; and an irregular pattern formed on the surface to be slid and including continuous ridge lines having concave portions and convex portions formed along a a sliding direction of the slider.

2. A displacement sensor according to claim 1, wherein the irregular pattern is formed to bring the convex portions to be in contact with the slider at plural portions.

3. A displacement sensor according to claim 1, wherein the irregular pattern is continuously formed along the sliding direction of the slider with a length longer than a sliding range of the slider or with a width wider than an operating width of the slider.

4. A displacement sensor according to claim 1, wherein the irregular pattern includes the concave portions of which depth is 3 $\mu$m or greater than that so as to be sufficiently deep relative to a particle diameter of abrasion powder produced by the slidable movement of the slider.

5. A contact-type displacement sensor for detecting a displacement of an object to be detected based on a change of a resistance value comprising:

a resistor having a surface to be slid;

a slider sliding on the surface to be slid in a predetermined direction in accordance with the displacement of the object to be detected;

an irregular pattern formed on the surface to be slid and including concave portions and convex portions continuously formed along a direction crossing or perpendicular to a sliding direction of the slider;

a displacement member assembled with the slider and displaced in accordance with the displacement of the object to be detected; and a projection formed at an electrically insulative portion being adjacent to a slider mounting portion on the displacement member and being projected toward the resistor.

6. A displacement sensor, according to claim 5, wherein the displacement member is a rotor in the shape of a circular plate or in a ring shaped structure which is rotated in accordance with the rotation of the object to be detected.

7. A contact-type displacement sensor for detecting a displacement of an object to be detected based on a change of a resistance value comprising:

a resistor having a surface to be slid;

a slider sliding on the surface to be slid in a predetermined direction in accordance with the displacement of the object to be detected;

an irregular pattern formed on the surface to be slid and including concave portions and convex portions continuously formed along a direction crossing or perpendicular to a sliding direction of the slider;

a rotational member displaced in accordance with the displacement of the object to be detected;

a claw formed on the rotational member;

a housing accommodating the rotational member therein and rotatably supporting the rotational member; and a notch formed in the housing or in a member fixed to the housing and into which the claw is inserted, wherein the rotational member is secured to the housing so as not to come out thereof by a rotational operation of the rotational member at a predetermined angle after the claw is inserted into the notch upon assembling.

8. A displacement sensor, according to claim 7, wherein the housing or the member fixed to the housing Includes a return stopper or a projection for preventing the rotational member from being rotated in a reverse direction after the rotational member is operated to be rotated at the predetermined angle upon assembling.

9. A contact-type displacement sensor for detecting a displacement of an object to be detected based on a change of a resistance value, comprising:

a resistor having a surface to be slid;

a slider sliding on the surface to be slid in a predetermined direction in accordance with the displacement of the object to be detected; and an irregular pattern formed on the surface to be slid and including grooves formed along a sliding direction of the slider.

* * * * *